L. A. McMAHEN.
MEANS FOR PROTECTING PERISHABLE GOODS IN TRANSIT.
APPLICATION FILED NOV. 29, 1915.
1,294,503.
Patented Feb. 18, 1919.
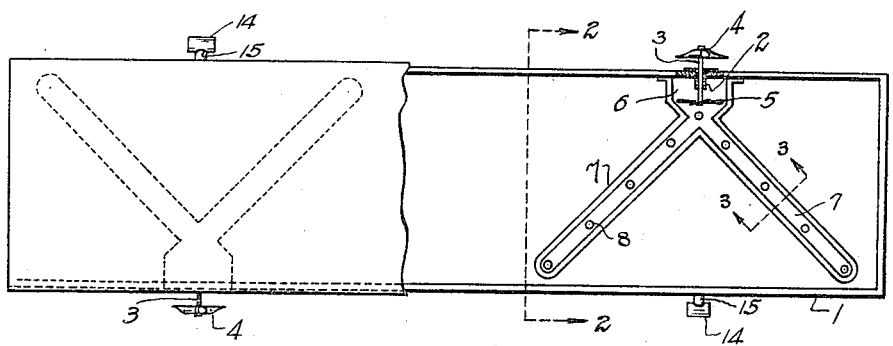
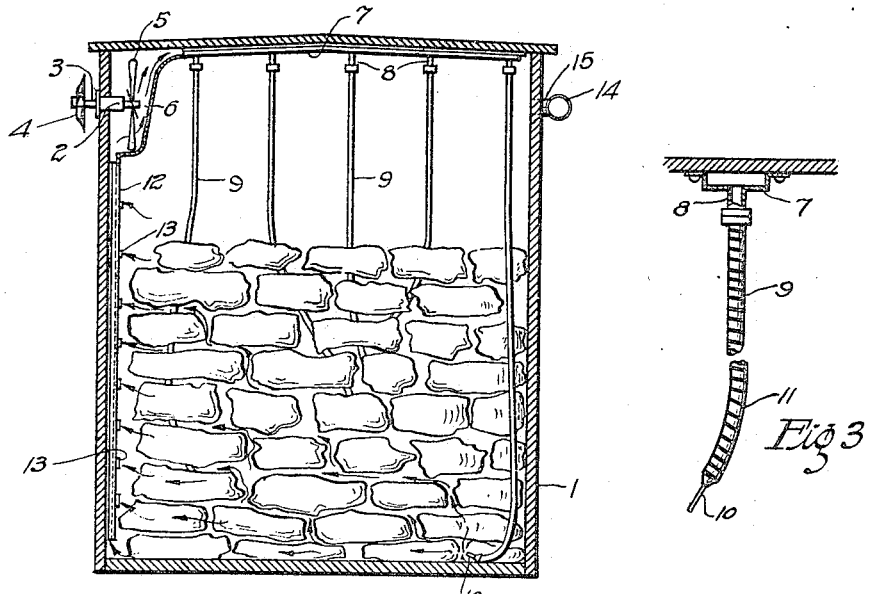
Witness
J. Gordon Barbee.
Inventor
Luke A. McMahen
By Ross D. Johnston Jr.
Attorney

UNITED STATES PATENT OFFICE.

LUKE A. McMAHEN, OF BIRMINGHAM, ALABAMA, ASSIGNOR, BY MESNE ASSIGNMENTS, TO REFRIGERATION PATENT SYNDICATE, A CORPORATION OF DELAWARE.

MEANS FOR PROTECTING PERISHABLE GOODS IN TRANSIT.

1,294,503.     Specification of Letters Patent.     Patented Feb. 18, 1919.

Application filed November 29, 1915. Serial No. 64,058.

*To all whom it may concern:*

Be it known that I, LUKE A. McMAHEN, a citizen of the United States of America, residing at Birmingham, in the county of Jefferson and State of Alabama, have invented certain new and useful Improvements in Means to Protect Perishable Goods in Transit, of which the following is a specification.

My invention relates to means for inducing a circulation of air through perishable goods in freight cars so as to reduce to a minimum the loss occasioned by the rotting of same during shipment.

Because of the damage to fruit and vegetables if rain or damp air gains access to the cars in which they are loaded, they are now generally shipped in box cars which, as a general rule, are not equipped with means to induce other than a direct draft of outside air through the car. According to my invention I provide within the car a fan, or several fans, equipped with wind wheel motors disposed outside the car and designed to be driven by the movement of the car and to drive the fans in a constant direction. I provide for each fan an air blast distributing means which receives the current of air generated by the fans and so distributes the same as to cause the air currents to circulate actively through the car's contents and thereby maintain the same dry, cool and free from heavy moist gases which in the still air of tightly closed cars will settle on the fruit and vegetables, causing quick deterioration and destruction thereof.

My distributing means will house the fans and be attached to the car so that it will not be liable to injury by the loading or shifting of the car's contents. Preferably such means will comprise shallow metal conduits attached along the roof and having wire wound pipes depending therefrom and adapted to be interposed between the crates, or bags, and discharge currents of air among them.

I may also provide the car with a ventilator which will operate to draw air out of the car during motion so as to effect a gradual change of air without direct admission of air currents liable to carry in an injurious quantity of moisture.

My invention also comprises the novel features of construction and arrangements of parts which are hereinafter described in their preferred embodiment, reference being had to the accompanying drawings, in which:—

Figure 1 is a plan view of a car with part of the cover broken away and showing one side in section to illustrate the fan bearings.

Fig. 2 is an enlarged vertical sectional view on the line 2—2 of Fig. 1.

Fig. 3 is a cross sectional view on the line 3—3 of Fig. 1.

Similar reference numerals refer to similar parts throughout the drawings.

I have shown my invention applied to a box car 1 of any ordinary type and I provide the following air circulation mechanism for each end of the car; namely, a bearing bushing 2 is rigidly mounted in the side of the car and preferably carries anti-friction balls or rollers (not shown) upon which a shaft 3 turns. On the outer end of the shaft is mounted a driving wheel 4 which may be of any ordinary or suitable construction that will cause it to be rotated in a fixed direction by the air resistance encountered when the car is moving in either direction or by a sidewise current of air. As shown, it is made of a series of scroll pockets or blades which present convex sides facing in the opposite direction from its intended direction of rotation, thereby causing its convex faces to face in an opposite direction to that of the main resistance from the air. Mounted on the inner end of the shaft is a fan or blower 5, the blades of which are disposed to drive currents of air through a casing 6 and into a pair of shallow metal conduits 7 which diverge diagonally crosswise of the car and thus afford a maximum distribution of the air over the end of the car in which the apparatus is located. Each conduit is provided with a plurality of nozzles 8 and to each of these nozzles is adapted to be coupled a flexible hose or tube 9 having a length sufficient to enable it to be passed down through the bags or crates of perishable goods so as to discharge the air from its open end 10 in position to create an effective distribution of air through the merchandise. Preferably each of these tubes is provided with coils of wire 11 to protect it from becoming compressed by a shifting of the freight and shutting off its air current.

The casing 6 is closed and is preferably provided with an intake pipe 12 through which the air is supplied to the fan 5, this pipe being U-shaped in cross section like the conduits 7 and extending to a point near the floor, where its bottom end is left open. In addition a plurality of inlet ports 13 are provided at different points along the pipe so as to distribute the return circulation throughout different levels in the car.

In operation, the movement of the car will operate the driving wheel in a constant direction and the fan, being driven thereby, will induce a circulation of air, drawing it in through the pipe 12 and distributing it through the conduits 7 and tubes 9 throughout the perishable goods, and this circulation will prevent the deterioration of the freight under ordinary conditions during shipment.

To induce a gradual change of air in closed cars, I provide at either or both ends and preferably opposite the fan, a ventilating cowl 14 formed by a horizontal pipe open at its ends and connected at its center to a nipple 15 which is inserted through the side of the car near the top thereof. The rush of air through 14 will induce by suction a slight current of air outwardly from the car through the nipple 15. The air thus drawn off is replaced by a gradual filtering in through the cracks or small holes of the car, and I thus obtain a change of air without giving access of any appreciable amount of moisture into the car. No rain or water can gain access into the car through the ventilator.

Having thus described my invention, what I claim as new and desire to secure by Letters Patent, is:—

1. In a freight car for transporting perishable freight, the combination with means responsive to the movement of the car to gradually exhaust air therefrom, of air circulating means within the car having its air inlet and outlet ports opening at different levels into the car, and means responsive to the movement of the car to operate said air circulating means.

2. In a carrier for transporting perishable freight, means which function responsive to the movement of the car to gradually exhaust air therefrom and effect a slow change of air in the carrier, said means being adapted to prevent direct access of air therethrough into the carrier, in combination with air circulating mechanism wholly contained within the carrier to effect therein a forced distribution of the gradually changing air throughout the perishable freight, said latter mechanism comprising distributers disposed and arranged to deliver the forced circulation throughout the perishable freight, and means to drive said air circulating mechanism.

3. In a carrier for transporting perishable freight, means external to the carrier and adapted to be driven unidirectionally by the motion of the carrier, a blower driven by said means and disposed interiorly of the carrier, and air circulating conduits disposed wholly within the interior of the carrier and opening only thereinto, said conduits embracing said blower, substantially as described.

4. In a carrier for transporting perishable freight, means external to the carrier and adapted to be driven unidirectionally by the motion of the carrier, a blower driven by said means and disposed interiorly of the carrier, and an air circulating conduit disposed wholly within the interior of the carrier and opening only thereinto, said conduit embracing said blower and having its discharge end adjustable to different levels.

5. In a carrier for transporting perishable freight, means external to the carrier and adapted to be driven unidirectionally by the motion of the carrier, a blower driven by said means and disposed interiorly of the carrier, an air circulation conduit disposed wholly within the interior of the carrier and opening only thereinto, said conduit embracing said blower and comprising an air intake portion having openings at different levels in the lower portion of the carrier, and a plurality of flexible discharge pipes adapted to be introduced throughout the perishable freight, as and for the purposes described.

6. In a carrier for perishable freight, the combination with a freight compartment closed against direct access of air, of an air circulating mechanism comprising a blower within said compartment, and air inlet and outlet pipes for said blower which all open within said compartment.

7. In a carrier for perishable freight, the combination with a freight compartment closed against direct access of air, of an air circulating mechanism comprising a blower within said compartment, and air inlet and outlet pipes for said blower which all open within said compartment and which are relatively adjustable to vary the points of air intake and discharge according to the character and requirements of the freight.

In testimony whereof I affix my signature.

LUKE A. McMAHEN.

Witness:
NOMIE WELSH.